2,602,560

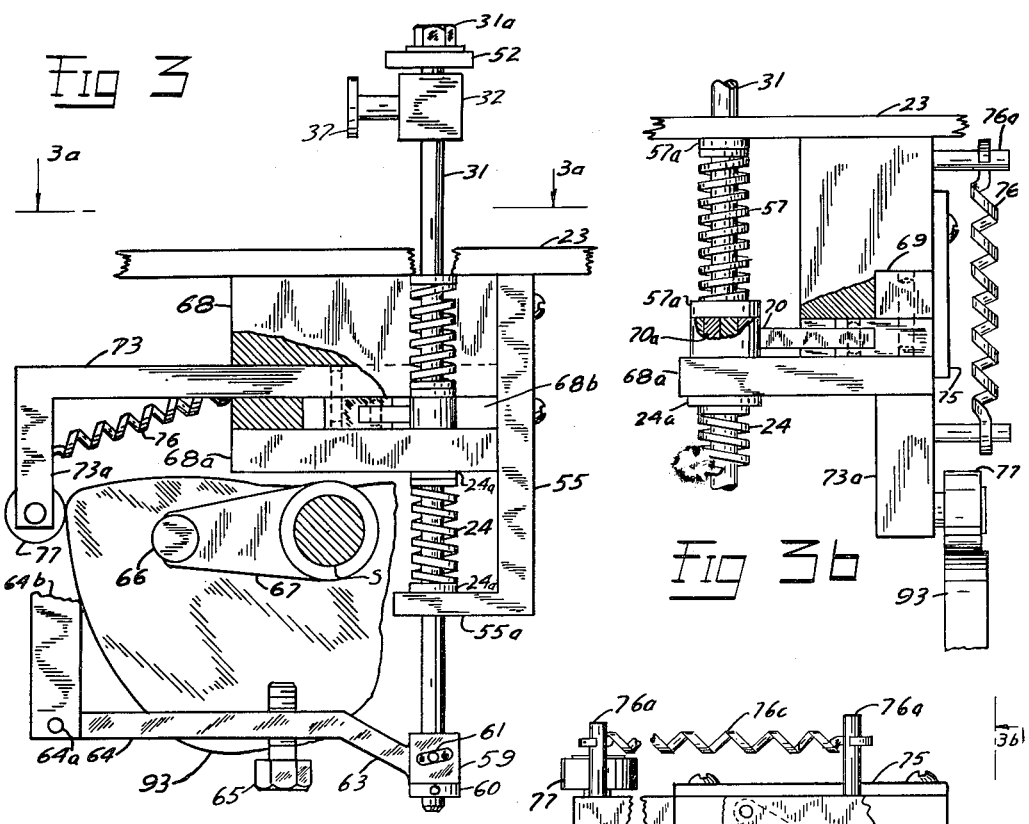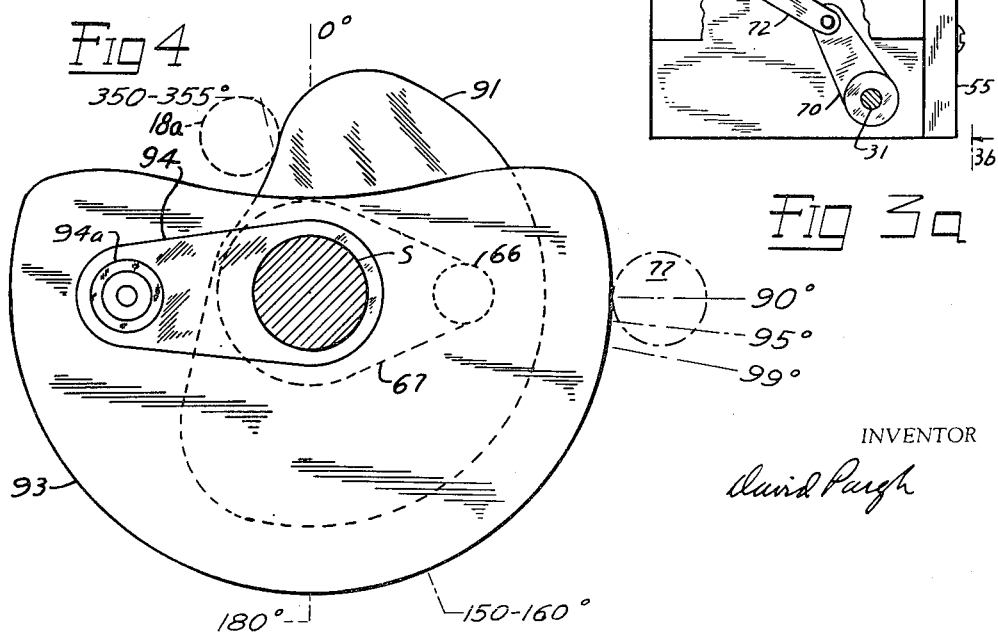

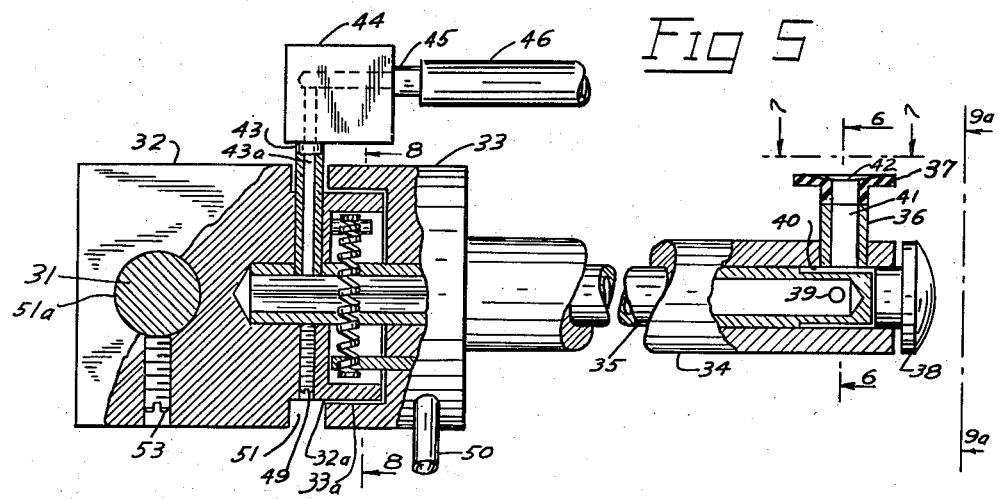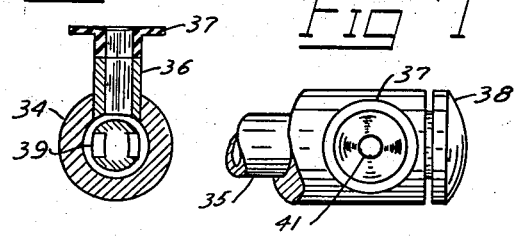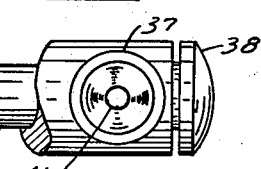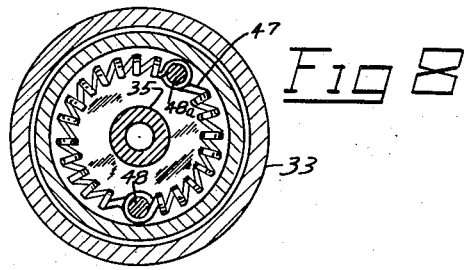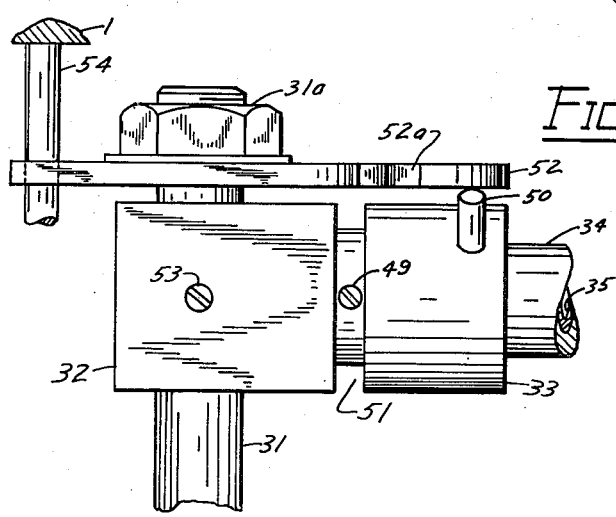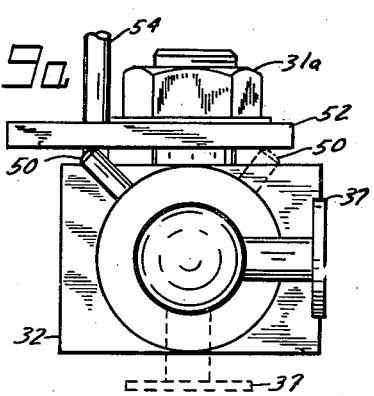
INVENTOR
David Pargh

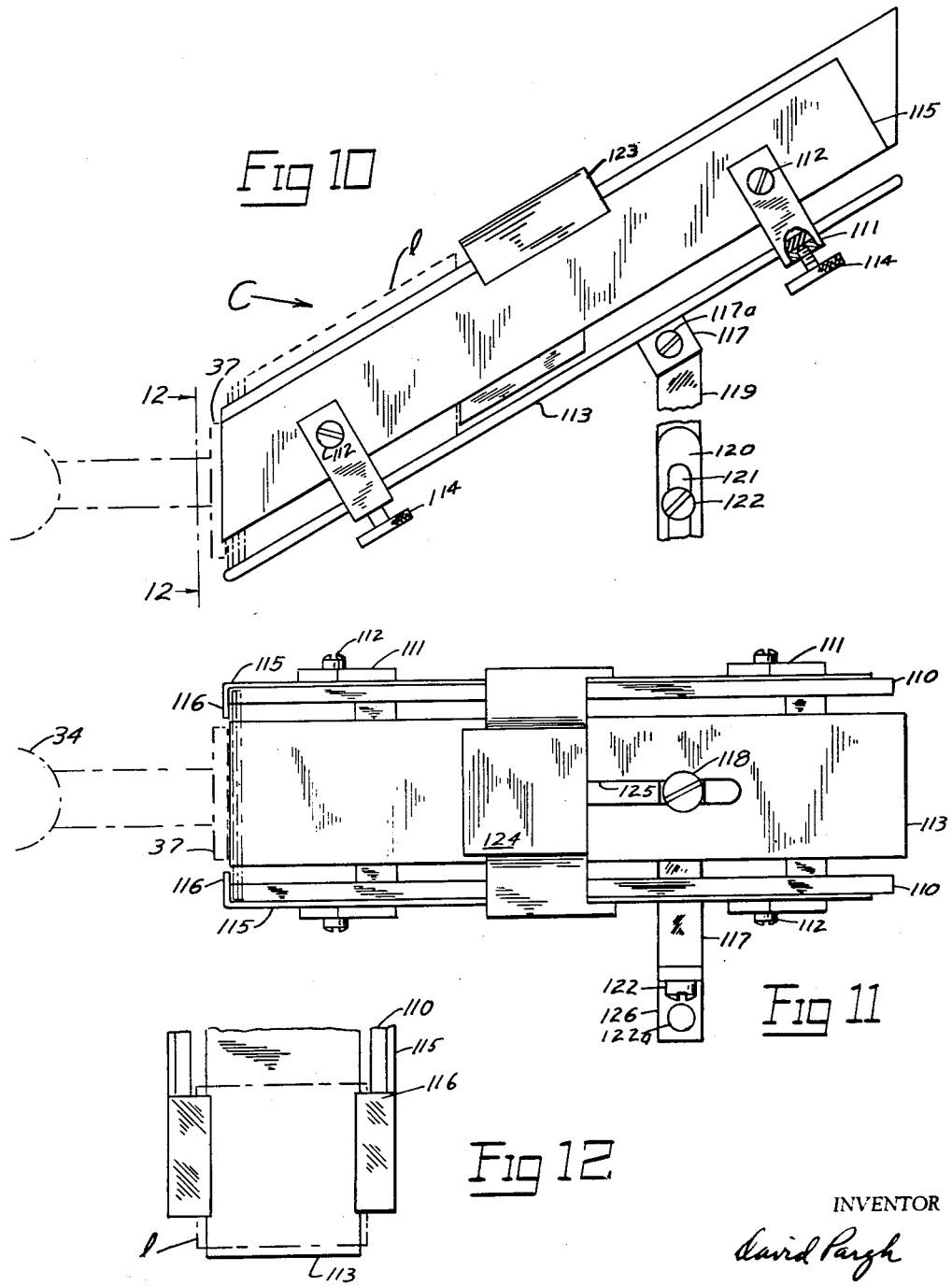

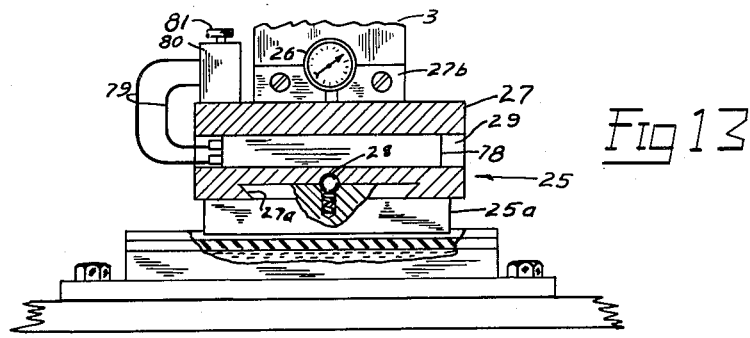
Fig 13
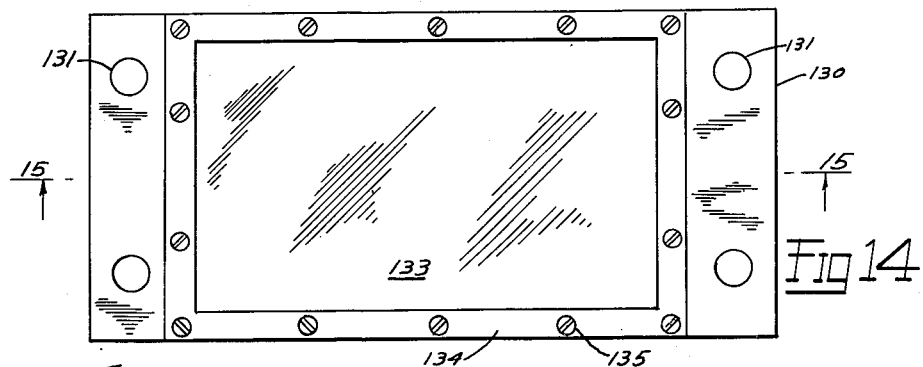
Fig 14
Fig 15
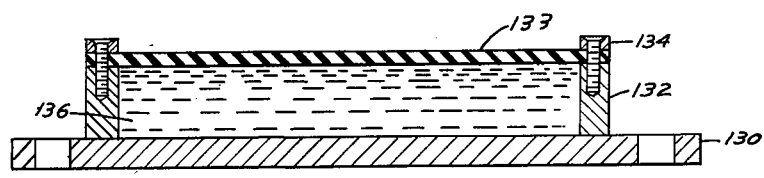
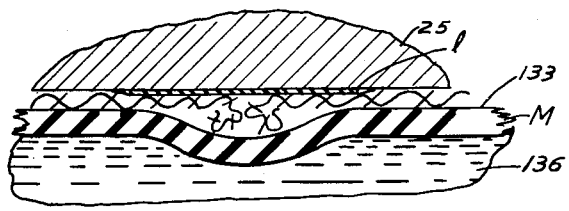
Fig 16
INVENTOR
David Pargh July 8, 1952     D. PARGH     2,602,560
LABELING MACHINE
Filed Feb. 1, 1950     7 Sheets-Sheet 7
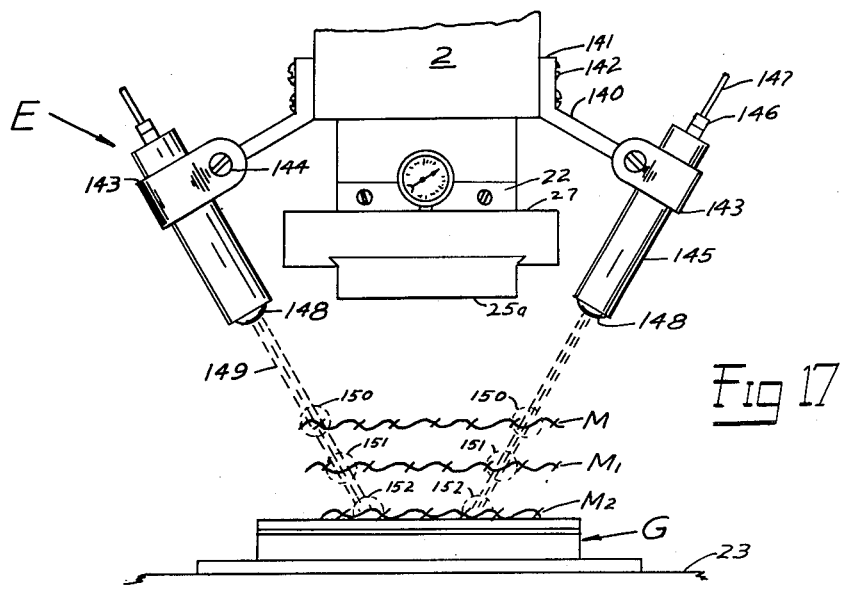
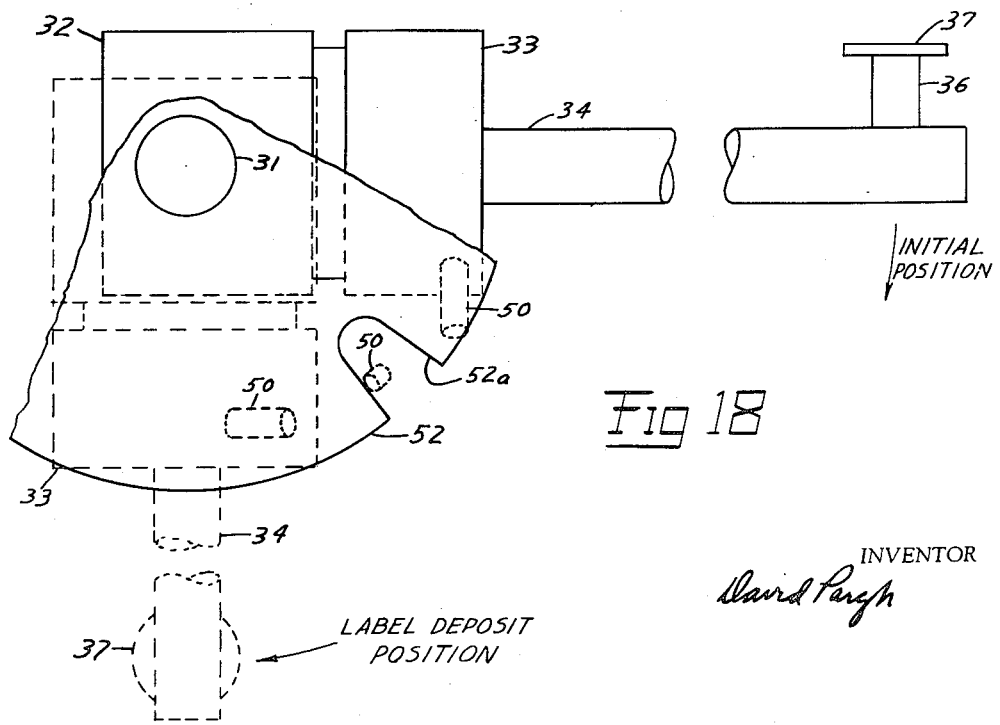
INVENTOR
David Pargh Patented July 8, 1952

UNITED STATES PATENT OFFICE 2,602,560

LABELING MACHINE

David Pargh, New York, N. Y.

Application February 1, 1950, Serial No. 141,715

11 Claims. (Cl. 216—55)

This invention relates to labelling machines and contemplates an apparatus for automatically removing a thermoplastic type of label from a label storage magazine, positioning it accurately centered on a designated portion of an article and affixing it thereto by the application of heat and pressure.

In the manufacture of articles made of fabric, leather, or other materials, it is necessary for the manufacturer to provide identification labels designating the sizes, types and source as well as other characteristics of the article. Such labels must necessarily be applied at low cost, with minimum effort and at a high rate of speed. It is also sometimes found expeditious in the manufacture of garments to apply such labels at the end of, and overlapping a seam so as to reinforce the seam and prevent it from unraveling. Thus the relatively expensive added step of lockstitching the seam ends is avoided. To accomplish this last objective, this invention includes means for effectively securing the labels on the non-planar portion of garments such as are present at the seams and pocket joints, for example.

It is therefore an object of this invention to provide a machine which will during one cycle, automatically remove a label from a magazine, transfer such label to a selected point on the surface of a garment, deposit the label and affix the label to the garment by the simultaneous application of heat and pressure.

Another object of this invention is to provide a novel light ray type optical label centering means in connection with a labelling machine which will facilitate accurate locating and centering of a label on a garment and which will be effective regardless of variations in the thickness or relative bulk of the particularr article selected for labelling.

It is a further object of this invention to provide in a labelling machine, an article receiving platen of unique construction which will accommodate garments having protuberances such as seams and which will present a flat surface to the action of the pressure head, and which will be effective under the conditions of heat and pressure necessary to secure thermoplastic bonding of the label to the article.

A still further object of this invention contemplates the provision of an improved label storing magazine for a labelling machine which is readily adjustable to accommodate various sizes of labels and which entails no mechanically actuated parts.

Another object of this invention is the provision of a pressure equalizer in connection with the pressing head of a labelling machine which will automatically compensate for differences in the relative bulk or thickness of articles selected at random for labelling.

It is also an object of this invention to provide in a labelling machine, an improved label transferring mechanism which is of simple construction and which, by the use of alternate suction and air pressure will effectively remove a label from the label storage magazine and deposit it properly centered on a designated area of an article.

A paramount object of this invention is to provide a semi-automatic labelling machine which is of simple design and inexpensive construction and so can be made to suit the needs of a small manufacturer.

The invention is particularly disclosed in the accompanying specification and drawings.

In the accompanying drawings:

Fig. 3 is a detailed view of the label transfer mechanism, showing the elements employed for translating the label transfer arm between label magazine and label deposit positions.

Figs. 3a and 3b are fragmentary views showing further details of the label transfer mechanism as viewed on lines 3a—3a of Fig. 3 and 3b—3b of Fig. 3a respectively.

Fig. 4 is a fragmentary view of the cam shaft assembly showing all of the operating cams and diagrammatically illustrates their sequence of operations.

Fig. 5 is a detailed view partly in section showing the structural details of the label transfer arm.

Fig. 6 is a fragmentary sectional view of the suction head of the transfer arm taken on line 6—6 of Fig. 5.

Fig. 7 is a fragmentary end view of a portion of the label transferring arm taken on line 7—7 of Fig. 5.

Fig. 8 is a section taken on line 8—8 of Fig. 5.

Fig. 9 is a more detailed view of a portion of the label transfer arm showing the index cam plate and index pin mechanism for rotating the transfer arm about its longitudinal axis.

Fig. 9a is an end view of the label transfer arm representing a view taken on line 9a—9a of Fig. 5 and shows the suction cup in its two extreme positions corresponding to initial label pick up and label deposit positions respectively.

Fig. 10 is a side elevation of the label magazine and also shows in greater detail the relation of the suction head on the transfer arm to the magazine.

Fig. 11 is a top view of the label magazine.

Fig. 12 is a fragmentary end view of the magazine showing the label discharge portion and is taken substantially on line 12—12 of Fig. 10.

Fig. 13 is a detailed view of the pressure head construction and also shows the arrangement of the platen relative to the pressure head.

Fig. 14 is a plan view of the platen.

Fig. 15 is a sectional view of the platen taken on line 15—15 of Fig. 14.

Fig. 16 is an illustrative enlarged showing of the manner in which the platen conforms to articles having non-planar surface portions.

Fig. 17 shows in detail the light ray label centering device, illustrating its particular application when articles of various thicknesses or bulks are encountered.

Fig. 18 diagrammatically illustrates the manner in which the index cam plate cooperates with the index pin on the label transfer arm to rotate the suction head.

The labelling machine comprising this invention may be divided into a number of sub assemblies for purposes of description. Thus, in Fig. 1, the pressure head assembly is generally designated as A; the transfer arm assembly is designated B; C identifies the label storage magazine; the cam shaft and power drive assembly is indicated by D; the light ray label centering assembly is indicated as E; and G designates the platen or article receiving bed.

*The pressure head assembly*

Figure 1:
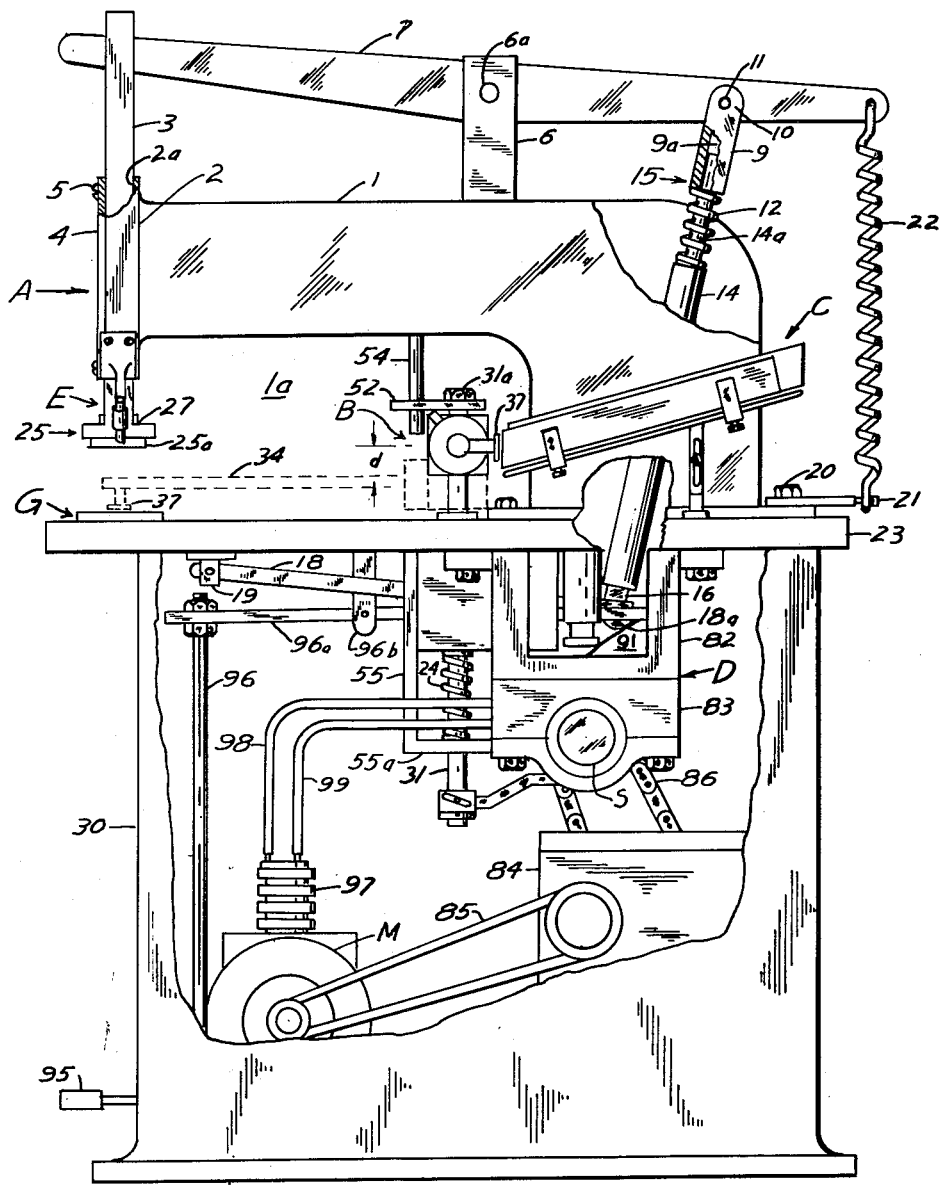
Fig. 1 is a side elevation of the labelling machine showing the general arrangement of parts including the label magazine, the transfer mechanism, the power drive means and the pressure applying head.
Figure 2:
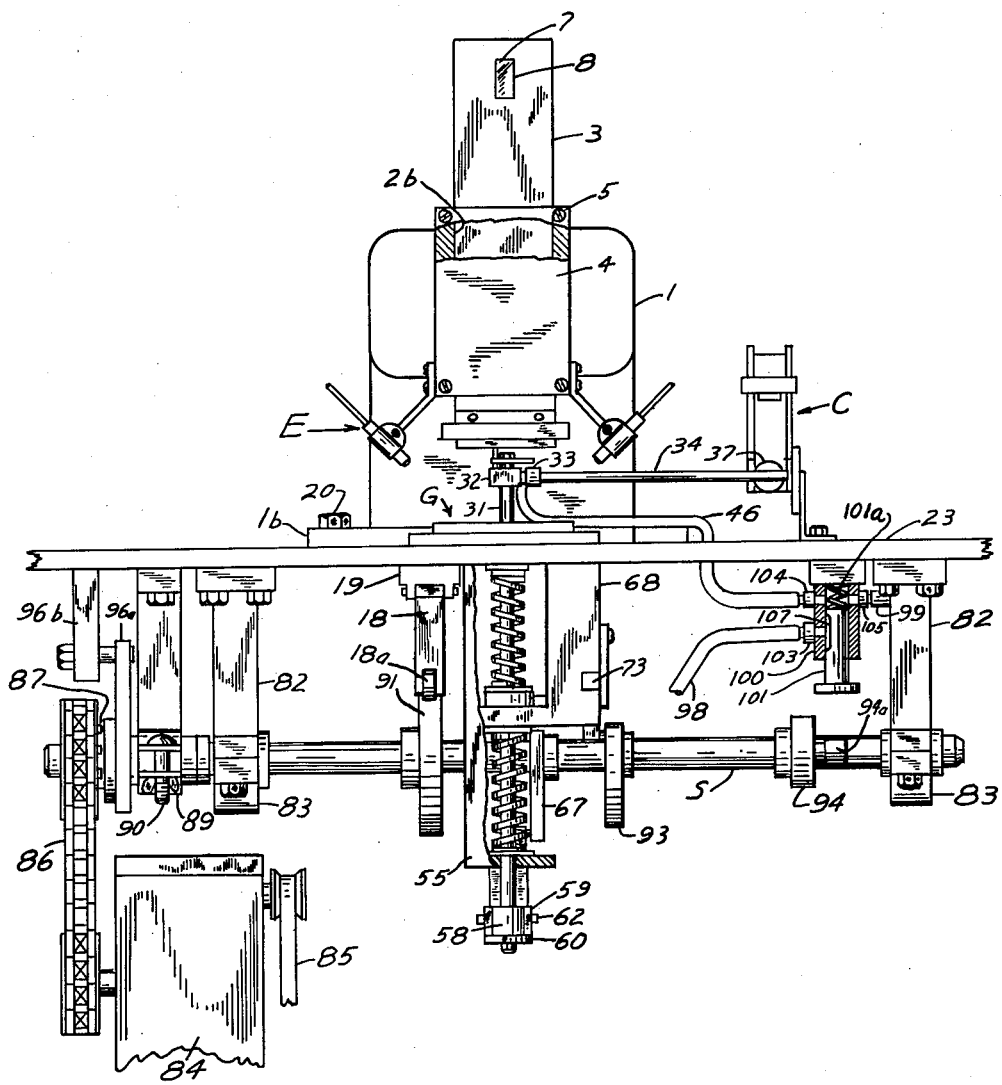
Fig. 2 is a fragmentary front view of the labelling machine showing in greater particularity the motivating means for controlling and actuating the transfer mechanism and pressure head, and also illustrates the arrangement of the light ray label centering means.

Referring particularly to Figs. 1 and 2 of the drawings, there is shown the upper frame of the machine 1, which is of L-shaped cantilever construction and defines relative to the work table 23, a throat area 1a. The frame 1 is secured to work table 23 by a flange portion 1b and fastening bolts 20. The front end of frame 1 has a plunger housing 2 secured thereto as by welding. A longitudinal slot is formed in the plunger housing and is defined by the back wall 2a shown in Fig. 1 and the side walls 2b as shown in Fig. 2. A face plate 4 overlies the open front portion of the slot and is secured to the head by suitable fastenings 5. A pressure head plunger 3 is slidably mounted in the slot.

The upper end of the pressure head plunger 3 is provided with a slot 8 as shown in Fig. 2 for slidably receiving one end of a plunger operating arm 7. Referring to Fig. 1, the plunger operating arm 7 is fulcrumed on the machine frame 1 by means of a pivot 6a carried by a fulcrum bracket 6 fastened to and supported by the machine frame. The other end of the rocking arm 7 extends beyond the pivot 6a and is resiliently connected to the machine frame by a spring 22 and spring anchoring bracket 21 fastened to the machine frame 1.

The pressure head is generally indicated by numeral 25 and is shown in detail in Fig. 13. The pressure head comprises a block 27 having a central core 29. The block 27 is provided with a pair of spaced flanges 27b as shown in Fig. 13 which provide a nest for receiving one end of pressure head plunger 3. The flanges are secured to plunger 3 by suitable fastenings as shown. A standard heating element 78 such as that manufactured by the General Electric Co., Catalogue No. 185–H is provided in the core 29 and is connected by electrical conductors 79 to a thermostat control 80 mounted on block 27. Thermostat control 80 is connected to a suitable supply source and is provided with a temperature adjusting knob 81. A dial type thermometer 26 is also mounted on block 27 to enable thermostat 80 to be adjusted to a preselected heat. The bottom face of block 27 is provided with a dovetail slot 27a in order to detachably receive any one of a set of interchangeable pressure irons 25a of various sizes. A spring detent 28 of standard construction permits rapid interchange of the presser irons.

A connecting rod 15, as shown in Fig. 1 is pivotally secured to plunger operating arm 7 intermediate the pivot point 6a and the said second end of the arm, by a pintle 11. The connecting rod is preferably made in two sections to provide a flexible automatic stroke adjustment for pressure head plunger 3. The upper section 9 comprises a clevis 10 for engaging rocking arm 7 to which it is pivotally connected by pin 11.

The upper portion 9 of the connecting rod is provided with a bore 9a. The second section 14 of connecting rod 15 is shouldered to provide a slide portion 14a of reduced diameter which is slidable within the bore 9a of member 9. The opposite end of the lower portion 14 of connecting rod 15 is provided with a flat 16 for connection with a cam follower 18 as shown in Fig. 1. As illustrated in Fig. 1, the cam follower arm 18 is pivoted to table 23 by means of a bracket 19 and the remote end of the arm carries a cam follower roller 18a engageable with a pressure head operating cam 91 to be subsequently described. By such construction an impositive connection is established between the operating cam 91 and the pressure head plunger 3. Thus, as articles of different thicknesses or bulk on which labels are to be applied are encountered, the slide portion 14a of connecting rod 15 will telescope within the bore 9a of upper portion 9, the pressure being transmitted to arm 7 and plunger 3 by spring 12. A relatively constant operating pressure is thereby obtained automatically, regardless of the thickness or bulkiness of an article which is fed into the machine. Moreover the need for manual adjustment is thereby obviated.

Table 23 also supports the transfer mechanism B and the platen G. A pedestal 30 is provided as a support for the machine within which is housed the cam shaft assembly D, the drive motor M, the transmission 84 and the pressure-vacuum supply pump 97. The transmission box indicated at 87 is a standard commercial item of the "Reeves" variable speed type. As shown in Figure 2, one power take off from the transmission 84 supplies power to cam shaft S through a chain drive 86. The transmission is in turn driven by a motor M through a belt 85 as shown in Figure 1. The motor is suitably coupled to vacuum pump 97 shown in Figure 1.

*Label transfer mechanism B*

A label transfer mechanism is provided to transfer the labels from label magazine C to platen G. See Figs. 1, 2, 3, 3a, 5 to 9a and 18. The transfer mechanism includes an arm 34 as shown in Figures 1, 2 and 5, secured to a hub 33. The transfer arm 34 as is more particularly shown in Fig. 5 comprises an outer shell traversed by an inner hollow tubular member 35. At one end, the inner sleeve 35 is shouldered to provide an annular chamber 40 within the inner periphery of the outer shell. Such shouldered portion of inner sleeve 35 is transversely bored as indicated at 39 to provide an air passage leading from the core of the sleeve to the annular chamber 40. Extending from the annular chamber 40 in the arm 34, a nozzle 36 is provided on the end of which there is secured as by cementing a resilient suction head 37. The face of the suction head is made relatively thin and is dished as indicated at 42 to improve the holding action when a label is picked up. A bore 41 extends through both the suction head and nozzle portion, and communicates with the annular chamber 40. A cap 38 is provided at the end of the arm 34 to close the end of the tube.

The outer shell of arm 34 is secured to or may be formed integrally with hub 33 while the inner sleeve 35 of the transfer arm extends through the hub and is rigidly fastened to a transfer arm head 32 by means of a set screw 49. The sleeve 35 thus provides a longitudinal axis about which the outer shell is rotatably mounted relative to transfer head 32. The transfer arm head 32 is shouldered and counterbored as shown in Figure 5 to provide an annular flange 32a about which recessed portion 33a of hub 33 is nested. A pair of anchoring studs 48 and 48a are secured to hub 33 and to head member 32 respectively. These studs as shown in Figures 5 and 8, serve as anchoring points for a toroidal spring 47 which annularly nests in the counterbored portion of head 32 as shown in Figure 5. Rotation of transfer arm 34 about the sleeve 35 therefore acts to tension spring 47 which exerts a restoring torque on the transfer arm 34 and hub 33. The spring 47 is suitably connected to the hub 33 and head 32 so as to bias the outer shell of transfer arm 34 approximately midway between its initial and label deposit positions. This position may be defined as lying between the full line and broken line positions of suction head 37 indicated in Figure 9a.

One face of hub 33 is suitably spaced from the shoulder of head member 32 to provide an annular recess 51 as shown in Figures 5 and 9. Such annular recess 51 provides clearance for a hollow nipple 43 which is secured to the head 32 and which has a bore 43a which communicates with the core portion of sleeve 35. Thus a continuous air passageway is provided through nipple 43, the bore of sleeve 35, nozzle 36 and suction head 37, while permitting free rotation of arm 34 relative to the transfer head 32. An air coupling 44 of standard commercial type is secured to nipple 43 and a second nipple 45 connects the air coupling to an air hose 46. The hose 46, as shown in Figure 2, is connected to port 104 of valve 100 to be subsequently described.

Referring more particularly to Figures 3, 5 and 9, transfer arm head 32 is shown as being secured to vertically extending transfer arm shaft 31 by a set screw 53. The shaft 31 extends through bore 51a provided in head 32 as shown in Figure 5. By suitable mechanism to be hereinafter described, the shaft 31 can be vertically reciprocated a distance d (see Fig. 1), and also rotated about its longitudinal axis through an angle of approximately 90 degrees once during each cycle of the machine operation. Such movement will be apparent by reference to Figures 1 and 2. In Figures 1 and 2, the transfer arm 34 is shown in the initial position it occupies at the start of a machine cycle when picking off a label from the label magazine C. The position of the label transfer arm at the point of depositing the label on the platen is shown in broken lines in Figure 1. It will be apparent from this figure, that the transfer arm 34 is rotated through an angle of 90 degrees in a horizontal plane about shaft 31 as an axis, that the arm is displaced vertically a distance d and that the nozzle portion 37 of the transfer arm is rotated about the longitudinal axis of arm 34 through an angle of 90 degrees. The mechanism for rotating nozzle 37 about the longitudinal axis of arm 34 will first be described.

In order to produce the necessary rotation of the nozzle portion 37 about the longitudinal axis of transfer arm 34, the previously described rotatable hub 33, the torsion spring 47 and an index pin 50 secured to the hub is employed. As shown in Figures 1, 9, 9a and 18, an indexing cam plate 52 is provided. This cam plate is rotatably secured to a shouldered end portion of shaft 31 by a nut 31a as best shown in Figure 9. The indexing cam plate 52 is, however, secured against rotation by a stud 54 (Figs. 1 and 9) secured to machine frame 1. The stud is slidable within a bore provided in cam plate 52 at a position suitably spaced from the axis of shaft 31. By this arrangement, transfer arm 34 together with hub 33 and transfer arm head 32 can rotate in a horizontal plane about shaft 31 relative to the cam plate 52, while the cam plate can reciprocate vertically together with transfer arm shaft 31. Camming plate 52 is further provided with a clearance slot 52a (see Fig. 18) for accommodating an index pin 50 secured to the periphery of hub 33.

Referring to the diagrammatic illustration of Figure 18, as well as to Figures 1, 2, 9 and 9a, it will be seen that as the transfer arm is displaced from its initial to label deposit position, cam plate 52 will reciprocate vertically with the transfer arm, as shaft 31 is reciprocated, but will be held against rotation by the anchor pin 54. In the initial position of transfer arm 34, index pin 50 underlies and abuts the under face of cam plate 52 as is clearly shown in Figures 9 and 9a (see also Fig. 18), and thus positions the portion of the transfer arm including the suction head 37 and hub 33 in the elevated horizontal position it normally occupies with the suction cup juxtaposed to the label magazine (Figs 1, 9a and 10). The previously referred to torsion spring 47 is so anchored as previously described with respect to transfer head 32 and hub 33 as to be normally untensioned when transfer arm 34 occupies a position intermediate the initial and label depositing positions of suction head 37. That is, a position corresponding approximately to 45 degrees between the full and dotted line positions of suction head 37 as indicated in Fig. 9a. In other words when the transfer arm is in the position illustrated in full lines in Fig. 9a, the under surface of cam plate 52 has urged index pin 50 to rotate the outer sleeve of the transfer arm against the resistance of spring 47, thereby tensioning the latter. Subsequently, as transfer arm 34 is rotated about axis 31, by means to be described, spring 47 will urge transfer arm 34 to rotate clockwise as viewed in Fig. 9a, and as soon as index pin 50 registers with the clearance slot 52a in cam plate 52 (see Fig. 18), the transfer arm will assume a position intermediate the full and broken line positions defined by suction head 37 in Fig. 9a. Now as the transfer arm 34 continues to be rotated in a horizontal plane about shaft 31, index pin 50 will obviously be rotated by an edge of said slot 52a and will then cam under another under surface of cam plate 52 and assume the broken line position shown in Fig. 9a, with the nozzle 37 pointed downwardly in label deposit position. By virtue of such rotation, spring 47 has again been tensioned so as to aid restoration of the transfer head when it is rotated back to its initial position. The means for providing the above referred to rotation of transfer arm 34 in a horizontal plane about shaft 31 as an axis, and the means for vertically reciprocating transfer arm shaft 31 and transfer arm 34 through the distance d (Fig. 1) will now be described.

The remainder of the transfer mechanism comprises a transfer arm operating means located below work table 23 adjacent the cam shaft assembly D. The transfer arm operating means is shown in Figs. 3, 3a and 3b of the drawings. It will be seen from these figures, that means are provided for vertically reciprocating transfer arm shaft 31 and for rotating such shaft in a horizontal plane to cyclically transport the transfer arm 34 and suction head 37 between its initial position juxtaposed to the label magazine C and label depositing position adjacent platen assembly G.

To effect vertical reciprocation of transfer arm 34 during each cycle, transfer arm shaft 31 is slidably mounted in the shelf 55a of a bracket 55, which, as shown in Figs. 2 and 3, is secured to a block 68 mounted on the under surface of work table 23. Shaft 31 also has a bearing surface in a ledge 68a forming part of the guide block 68. A compression spring 24 encircling shaft 31 is mounted between the under surface of ledge 68a and a face of the shelf 55a as shown in both Figs. 3 and 2. Suitable thrust washers 24a may be provided to seat the ends of the spring. The lower end of transfer arm shaft 31 is provided with a thrust washer 60 secured thereto as shown in both Figs. 2 and 3. A bushing 58 (Fig. 2) is slidably mounted on shaft 31 and is adapted to bear against thrust washer 60. The bushing is provided with a pair of laterally extending trunnions 62.

Referring to Fig. 3, an actuating arm 63 is provided for reciprocating the shaft 31 in a vertical direction. The actuating arm has a forked hub portion 59 surrounding the bushing 58 and an offset portion 64 extending rearwardly from shaft 31 into the general proximity of the operating cam shaft S. The offset portion 64 of the operating arm supports an adjustable cam follower stud 65. The remote end of the actuating arm is pivotally mounted on a bracket 64b secured to table 23. Opposed inclined slots 61 are provided in the sides of the hub portion 59 and the trunnion pins 62 secured at diametrically opposed points to bushing 58 slidably engaged in these slots. A crank arm or vertical lift cam 67 is secured to cam shaft S and extends to a point where its arc of rotation will intercept said adjustable stud 65 at a specified point in the operating cycle of cam shaft S as shown in Fig. 3. A roller 66 is rotatably secured to crank arm 67 and is adapted to engage the end of stud 65 during cycling of cam shaft S. The action of the vertical reciprocating mechanism for transfer arm shaft 31 is apparent from Fig. 3. Each cycle of cam shaft S causes a vertical displacement of actuating arm 63 about pivot 64a as it is engaged by crank arm 67. Such thrust is transmitted to bushing 58 through the trunnion pins 62, and since collar 58 bears against washer 60, the transfer arm shaft 31 and the transfer arm assembly 34 which is secured thereto will be displaced vertically. The inclined slots 61 provide the necessary clearance for trunnions 62. Compression spring 24 is of course compressed during such downward displacement of arm 63 and at the instant that cam roller is disengaged from stud 65, the shaft 31 is restored to its initial elevated position.

It has been mentioned that it is also necessary to rotate shaft 31 in order to provide for the necessary displacement of transfer arm 34 in a horizontal plane from label pick up to label deposit positions. The mechanism for accomplishing such rotational movement comprises spring 76, crank 70, link 72 and slider arm 73 as shown in Figs. 3, 3a and 3b. As shown in these figures, a guide block 68 is provided which is secured to the underside of table 23 (see Figs. 2 and 3). The guide block includes a ledge portion 68a extending laterally therefrom as shown in Figs. 3 and 3b and, as best shown in Fig. 3, the portion of block 68 contiguous with ledge 68a is milled through for a portion of the length of the slot to provide a clearance chamber 68b. A slide chamber 69 is also provided on one face of block 68 extending lengthwise of the block. A slide rod 73 is slidably mounted in chamber 69 and is retained therein by a gib 75 secured to the front face of block 68 as shown in Fig. 3b. Slide rod 73 carries a depending arm 73a as shown in Fig. 3, the end of the arm being provided with a pintle to accommodate cam follower roller 77 (see Fig. 3b). A tension spring 76 anchored to block 68 and to slide rod 73 as shown in Fig. 3b respectively, normally urges the slide rod to the right as viewed in Fig. 3.

Considering Figs. 2 and 3, the previously mentioned transfer arm shaft 31 extends through a bore provided in ledge portion 68a of block 68. A crank 70 is supported on the upper surface of ledge 68a and has a slotted hub which is secured to shaft 31 so as to rotate therewith but so as to allow longitudinal displacement of said shaft therethrough. For this purpose, shaft 31 is provided with a longitudinal keyway, and a key 70a (Fig. 3b) interlocks the hub of crank 70 and shaft 31. The key is retained in place by the pressure of spring 57 seated in cup shaped washer 57a. The purpose of such arrangement is to permit longitudinal displacement of shaft 31 through the hub portion of crank 70 without affecting displacement of said crank or key 70a. Moreover such construction facilitates rapid assembly of the respective elements of the transfer mechanism. A link 72 is pivotally secured to the end of crank 70 and to slide rod 73 by suitable pins as shown in Figs. 3 to 3b. It will therefore be apparent that as transfer arm cam 93 rotates counterclockwise as viewed in Fig. 3 during a cycle of the machine, roller 77 will clear the cam, allowing spring 76 to displace slide rod 73 to the right. Such motion is transmitted by link 72 and crank 70 to transfer arm shaft 31, causing such shaft to rotate clockwise (as seen in Fig. 3a) approximately 90 degrees. In such manner the transfer arm 34 and suction head 37 carried by shaft 31 are rotated in a horizontal plane from initial label pick up position to label deposit position, that is, from the solid to the broken line positions shown in Figs. 1 and 18 respectively.

An important feature of such construction of this portion of the transfer mechanism, results from the particular arrangement of transfer cam 93, slide 73 and spring 76. As above described, rotation of transfer arm 34 from its initial position to label deposit position is accomplished by spring 76, the cam 93 acting only to restore slide 73 and transfer arm 34 back to initial position. In the operation of the labelling machine, it frequently happens, that after a machine cycle is started, due to misalignment of the article to be labelled or to other conditions, it is necessary to instantly interrupt the depositing of a label on to the article. Since transfer arm 34 is urged toward the platen only by the force of spring 76, the operator can easily arrest the motion of the arm merely by placing his hand in front of it, without interfering in any way with the main operating mechanism of the machine. The machine can therefore continue through its cycle, the transfer arm being arrested to prevent deposit of a label. Such action does not interfere with the normal motion of transfer arm cam 93, since such cam merely picks up follower 77 at whatever position it has been arrested, and completes the restoring cycle.

*Cam shaft assembly D*

The cam shaft assembly is shown principally in Fig. 2 of the drawings. Cam shaft S is shown rotatably mounted spaced from the under side of table 23 by a pair of ball bearing pillow blocks 83 mounted on bearing supports 82. A clutch 87 is provided adjacent one end of the shaft S. This clutch is of the power press type permitting coupling of shaft S with the power driven means 85 upon depression of pedal 95 which actuates levers 96, 96a (Fig. 1). Upon completion of one cycle (360 degrees) of rotation, clutch 87 disengages the power drive means 84 from cam shaft S. Such clutch is of standard commercial design and well known in the mechanical arts and will not further be described. A manually adjustable friction brake 89 is provided, the tension of which is adjusted by a screw 90. The purpose of this brake is to limit over running of the operating cams due to rotational inertia.

Four operating cams are provided and are fastened to cam shaft S at spaced intervals by means of collars and set screws. These four cams are: the pressure head operating cam 91 for reciprocating the pressure head plunger 3, the transfer arm vertical crank and roller cam 66—67, the transfer arm horizontal reciprocating cam 93 and the vacuum valve control cam 94. The action of pressure head operating cam 91 is clearly shown in Fig. 1, and has previously been described as effecting reciprocation of pressure head 25 and plunger 3 by displacing cam follower roller 18a, connecting rod 15 and cross arm 7.

The transfer arm vertical reciprocating crank and roller 66—67 produces vertical displacement through the distance d (Fig. 1), of transfer arm 34 from its initial elevated label receiving position adjacent the mouth of the label magazine to label deposit position adjacent the platen G.

Transfer arm horizontal reciprocating cam 93 is shown in Fig. 3, and, as previously described, acts to restore the transfer arm 34 by rotating it in a horizontal plane from label deposit to initial position.

The vacuum control cam 94 as shown in Fig. 2 comprises a disc 94 and roller 94a rotatably secured adjacent the periphery of the disc. Such roller produces displacement of the slide 101 of vacuum control valve 100.

The interior of valve 100 is shown in section in Fig. 2. Specifically, a port 104 is provided which is connected by flexible tube 46 to transfer arm 34 for establishing communication with the previously described suction cup 37 (see also Fig. 5). Port 103 of the valve is connected by a hose 98 to the pressure side of vacuum pump 97 mounted within the base of the machine as seen in Fig. 1. A second vacuum port 105 is provided opposite port 104 and is connected by a hose 99 to the vacuum side of pump 97. The slide 101 is recessed at one portion to provide a passage 107. Figure 2 shows the position of valve slide 101 at the start of a machine cycle. In such position it is apparent that communication is established between the vacuum side of the vacuum pump, through hose 99, vacuum inlet port 105, port 104, hose 46 and the suction cup 37 on transfer arm 34. The suction thus created will cause the suction cup 37 to adhere against a label disposed in the mouth of the label magazine. Subsequent rotation of cam shaft S is effective to translate transfer arm 34 from initial to label deposit position, and during such rotation, valve slide 101 will have been displaced upwardly as viewed in Fig. 2 to seal off vacuum inlet port 105 and establish communication between ports 103 and 104, connecting the pressure side of the vacuum pump to suction cup 37. Such connection is established when the suction cup is juxtaposed to platen G (see the dotted line position of transfer arm 34 in Fig. 1) and the resultant slight positive air pressure applied to suction cup 37 is effective to break the adhesion between the transferred label and the suction head. Such action facilitates depositing of the label on the article to be labelled. The valve slide 101 is maintained within the valve chamber by a conventional pin and slot arrangement (not shown). If desired, a small compression spring 101a may be provided within the chamber to insure engagement between valve slide 101 and the operating crank roller 94a.

It is thus apparent that each rotation of cam shaft S produces a reciprocation of transfer arm 34 in both a horizontal and vertical plane by means of cams 67 and 93, causes reciprocation of pressure head 25 by cam 91 and controls sequential operation of the pressure vacuum valve 100.

The sequence of operation of the various elements involved in the transfer and affixing of a thermoplastic label to an article during 1 cycle of operation of the labelling machine is illustrated in Fig. 4. In this figure, the above described control cams are shown oriented on cam shaft S. This view is from the right side of Fig. 2 looking endwise at cam shaft S. As there shown, during approximately the first 5 degrees of rotation of cam shaft S in a clockwise direction, the lobe of transfer arm horizontal reciprocating cam 93 will be displaced from blocking engagement with roller 77 of slide 73, thus permitting spring 76 to rotate transfer arm 34 in a horizontal plane as above described. Such action occupies approximately 90 degrees of the operating cycle.

During the next 5 degrees of rotation, roller 66 of transfer arm vertical reciprocating cam 67 will contact stud 65 (Fig. 3) to lower the horizontally rotated transfer arm 34 in the direction of platen G. During such latter 5 degree rotation of cam shaft S, vacuum valve control cam 94 will have actuated slide 101 in valve 100 (Fig. 2) to cut off the vacuum from suction head 37 and position said slide so that a slight positive pressure will be applied to suction head 37 to blow off the label on to the article. During approximately the next 4 degree rotation of cam shaft S, transfer arm lift cam 67 will release stud 65 and permit spring 24 to elevate the transfer arm 34; valve cam 94 again reverses valve 100 to apply vacuum to suction head 37 and the lobe portion of transfer arm horizontal reciprocating cam 93 will engage and displace roller 77 to start reverse rotation of transfer arm 34 horizontally back to initial label receiving position. In other words, the label transfer mechanism will have completed its particular cycle of operation during approximately 150 to 160 degrees of rotation of cam shaft S, to transfer a label from magazine C on to an article on platen G, and to restore the transfer arm 34 back to its initial label receiving position ready to pick off another label.

When cam shaft S has been rotated approximately 150 to 160 degrees from zero position, the rise portion of pressure head operating cam 91 will start to displace roller 18a of the pressure head operating mechanism (see Fig. 2) to lower pressure head 25 together with the presser iron 25a on to platen G. Such actuation of the pressure head occupies approximately another 190 degrees of the operating cycle, in order to apply the necessary pressure and heat to secure proper adhesion of the label on to the article. At a point approximately 5 to 10 degrees from top center or zero position of cam shaft S (i. e. in the position labelled 350–355 deg. in Fig. 4), the dwell portion of pressure head cam 91 becomes juxtaposed to lift roller 18a of the pressure head operating assembly and the pressure head 25 starts to rise to initial position. Thus, the transfer arm 34 is restored to label pick up position adjacent the mouth of the label magazine, suction will be applied to suction head 37 and the label transfer mechanism and pressure head assembly will be readied for another cycle of operation.

It is thus apparent that the above described cam shaft assembly comprises a central control means for sequentially actuating the label transfer mechanism including the associated label pick off and depositing means and the pressure head assembly.

*Label storage magazine C*

The label storage magazine indicated generally as C in Fig. 1 and in Fig. 2, provides means for handling a supply of labels of various sizes and for positioning them so that they will be centered on suction head 37 regardless of the particular size of label employed. As shown in Figs. 1 and 2, the label magazine is mounted on one side of machine frame 1 by an adjustable support whereby the angle of inclination of the storage chamber as well as the elevation of the mouth or label discharge opening of the label storing chamber may easily be adjusted to effect maximum efficacy of label feeding. The label magazine is shown in detail in Figs. 10 to 12 of the drawings.

The label magazine comprises a pair of spaced side walls 110 joined by a pair of U brackets 111 which are secured to each side wall by a screw fastening such as 112. A base plate 113 is adjustably supported on the horizontal portions of brackets 111. Referring to Fig. 10, a pair of adjusting screws 114 are threaded through the horizontal portion of each U bracket 111 to provide means to vary the position of base plate 113 vertically with respect to the side plates 110. Thus, the vertical height of the magazine chamber can be adjusted to accommodate labels having different dimensions. A pair of relatively thin strips 115 are provided on the outside faces of the side walls 110 as shown in Figs. 10 and 11 and the ends of the strips adjacent the forward portion of the label magazine are directed inwardly towards the chamber of the magazine to provide lips 116 which form a restricted mouth opening to retain the labels within the storage chamber. Fig. 12 is a front view of the mouth portion of the label magazine as seen on line 12—12 of Fig. 10, and shows in broken lines a foremost label $l$ being retained by the lips 116.

The bracket for supporting the magazine on work table 23 includes a horizontal portion 117 (Fig. 10) to which the base plate 113 of the magazine is adjustably secured by a fastening screw 118. A longitudinal slot 125 is provided in base plate 113 as shown in Fig. 11, which cooperates with the screw 118 to provide adjustment of the magazine along its longitudinal axis. The supporting bracket also includes two vertically extending portions 119, 120, the latter portion terminating in a foot 126 having a screw receiving opening 122a and is thus adapted to be secured to work table 23. Portion 120 is further provided with a longitudinal adjusting slot 121 as shown in Fig. 10 and an adjusting screw 122 traverses such slot and is threaded into portion 119 of the bracket. The position of suction head 37 of transfer arm 34 is indicated both in Figs. 10 and 11 in broken lines in its initial label receiving position. It is apparent from these figures, that the longitudinal adjustment provided by slot 125 and screw 118 and the vertical adjustment provided by slot 121 and screw 122 facilitates adjustment of the mouth portion of the chamber relative to suction head 37. Thus the magazine may be bodily tilted about pivot 117a to align the mouth parallel with suction head 37, the magazine may be shifted longitudinally to closely position the foremost label $l$ against the suction head, and the magazine may be vertically adjusted so that the foremost label will be properly centered relative to head 37.

A sliding weight 124 is provided to force the supply of labels $l$ against the lips 116 forming the mouth of the magazine. The weight is preferably provided with a pair of bent over wings 123 adapted to slide on the upper edges of the side plates 110. The weight is therefore easily removable or retractable to permit loading of labels within the storage chamber.

*The platen G*

The label machine is provided with a unique platen for permitting the application of uniform pressure on the label during the label affixing operation regardless of the presence of nonplanar portions on the surface of the article to which a label is to be attached. It sometimes is necessary to apply the label on to an article in the region of a seam, joint, rib, or other nonplanar protuberance and the provision of such platen enables proper adhesion between the label and article to be obtained under such conditions.

The platen G is shown in detail in Figs. 14 to 16 and is further illustrated in relation to pressure head 25 in Fig. 13. Referring to Figs. 14 and 15, the platen is shown as comprising a base plate 30 to which an upstanding wall portion 132 is secured to provide an enclosed well or chamber. Suitable recesses 131 are provided in base 130 to accommodate fastening screws by which the platen is secured to the work table 23 of the machine as shown in Figs. 1, 2 and 13. The well or chamber formed by walls 132 is preferably filled with a fluid or liquid as shown in Fig. 15. Water, mercury, as well as various oils have been found suitable as a filling material. In certain instances, sponge rubber and other resilient fillers may be employed, but the fluid filler yields better results. In any event, the fluid is sealed in place by an elastic membrane 133 which covers the chamber, and which is secured to the side walls 132 by a clamping ring 134 and suitable screw fastenings 135 as shown in Figs. 14 and 15. A satisfactory material for the membrane has been found to be any one of the heat resistant artificial rubbers such as "neoprene." The recently available "silicone" rubbers have also been found satisfactory for such purpose.

It will be apparent from a consideration of Figs. 15 and 16, that the combination of membrane 133 and filler 136 forms a resistant yet yieldable pressure surface to the action of presser iron 25a. Thus, if a flat planar article is inserted on platen G, the membrane 133 and supporting filler will provide a uniform pressing surface. On the other hand, should a protuberance such as the folded seam illustrated in Fig. 16 be present on an article M to which a label is to be applied, a portion of the membrane 133 will yield, or be deformed, displacing the fluid filler 136 as is clearly shown in this figure, and yet provide (considering the surface of the membrane as a whole) a uniform resistance to label $l$ as it is pressed on the article by the presser iron 25a.

Label locating and centering mechanism E

In the operation of labelling machines, articles of various thicknesses and relative bulk are normally encountered. Thus, in the labelling of clothes, shirts, leather receptacles, etc., the finished articles may be brought to the labelling machine folded and ready for subsequent packing. It will be obvious that garments such as trousers will have a different bulk thickness than a shirt, while the relative thickness of an article such as a brief case will be greatly disproportionate as compared to a garment such as an undershirt. The grading of articles according to bulk or size preparatory to labelling as is sometimes done in order that a given batch of uniformly dimensioned articles can be labelled by an operator who mentally establishes a label deposit position on the first one or two articles and carries such position in his mind to align subsequent articles of similar size and shape, entails a great deal of extra manual labor and expense. Since, however, it nevertheless is necessary for commercial reasons to apply the label neatly centered on a designated portion of the article, this invention includes a unique label centering means which facilitates the location and centering of a label on any article selected at random from a pile, without regard to its particular thickness, bulk or size.

The label locating mechanism is shown in one embodiment in Fig. 17. The mechanism comprises a plurality of light sources 145. These are of a standard commercial variety, having an adjustable focusing lens 148 providing a ray of light indicated at 149. The light sources are secured to the machine frame head 2 by suitable clamp collars 143 fastened to brackets 140 by means of adjusting screws 144. The brackets are provided with flanges 141 engaging sides of the machine frame head section 2. Screw fastenings 142 cooperating with slots in the brackets provide means for adjustably securing the brackets 140 to the machine.

Figure 17 shows how the projection of the light rays 149 on any interposed surface such as indicated by the articles M, M₁, or M₂ will provide a plurality of planarly spaced spots or focus points such as is indicated by the circles 150—150, 151—151 and 152—152 on each of the surfaces respectively. These spaced light spots define, as the case may be, a spot, line, or outline pattern, depending on the number of light sources employed, on any of the referred to interposed surfaces M, etc., indicating in prospect the exact point at which a label, when subsequently deposited by transfer arm 34, will be deposited. That is the light sources are initially installed and adjusted so that the projected ray or rays will indicate on the platen G, the exact point at which transfer arm 34 will deposit a label. The various surfaces designated M, M₁ and M₂ exemplify garments or articles of various thicknesses or bulk and it is thereby apparent that the projected spot, line defining spots, or other light pattern, furnishes an optical identifying area enabling the operator to position an article regardless of size, on the platen G and accurately correlate the desired portion of the article where it is desired to place a label with the actual position where a label will actually be deposited. By such means it is possible to always properly center a label neatly on a designated selected point of the article.

It is apparent that the label centering means above described can be embodied in numerous other types of mechanisms. An apparent modification for example, consists of an optical projection apparatus similar to those used to project slides, mounted on machine frame 2 in place of the light sources 145. The slide projector is adapted to receive a slide having the same area as a label and therefore projects a locating area similar to the locating spots provided by the above described light sources.

The various features of the disclosed invention have been described in connection with one exemplary embodiment. These features, however may be incorporated in numerous alternate mechanisms and structural combinations. It is not intended therefore to limit the disclosed invention to the particular form of labelling machine disclosed but to all the embodiments and modifications contemplatable within the appended claims.

What is claimed is:

1. A labelling machine having a specified cycle of operation for affixing a label to an article comprising, an article receiving platen, a gravity feed label storing magazine mounted at a position laterally displaced from and elevated with respect to said platen, a label transfer mechanism having a particular cycle of operation occurring within the limits of said machine cycle, means for displacing said label transfer mechanism between magazine and platen positions respectively, said transfer mechanism including cyclically controlled means for removing a stored label from said magazine when in magazine position and for ejecting said label when in platen position, means for simultaneously applying heat and pressure to the deposited label, and control means for sequentially actuating the label transfer means, the label removing and ejecting means and the pressure and heat applying means, said transfer mechanism control means completing its particular cycle of operation to transfer a label from the magazine on to the platen within said specified complete cycle of the machine and before the control means for said pressure and heat mechanism commences operation.

2. In a machine for applying thermoplastic labels to articles by the application of heat and pressure, an article receiving platen, a label storage magazine having a label discharge opening located in a plane non-planarly disposed relative to the face of the platen, said plane being horizontally offset from the platen in a first and second dimension and being further spatially offset in a vertical direction relative to said platen, a label transfer mechanism displaceable between the specified magazine and platen positions respectively, said transfer mechanism including a transfer arm and label carrying head, means for reciprocating said arm in a like dimensional and spatially offset pattern, means for applying suction to said head portion when the latter is in magazine position and means for applying pressure to said head when the transfer mechanism is juxtaposed to said platen.

3. In a labelling machine, a label transfer mechanism for transporting labels from a storage magazine to an article receiving platen comprising, a label transfer arm mounted for rotational movement about each of two intersecting axes respectively, means for displacing said arm longitudinally of one of said axes, means for reciprocating said transfer arm about said one axis, said means including resilient biasing means for displacing the arm in one direction of reciprocation, means for oscillating said arm about the other of said intersecting axes between two specified limit positions, said latter oscillating means comprising a spring normally biasing said arm to a position intermediate said two limit positions, and index means actuated by the motion of said transfer arm for oscillating said arm from said intermediate to each of said specified limit positions.

4. In a labelling machine, a label pressing head having a flat surfaced pressing iron for affixing labels to an article, a platen for receiving the article to be labelled, said platen comprising a chamber, a liquid filling the chamber and a resilient elastic membrane confining the liquid in said chamber, said membrane and said liquid providing a yieldable mass conforming to the planar portion of said pressing iron when pressing a label on to said article.

5. The structure as set forth in claim 4 in which the filler material comprises a liquid, and the membrane consists of an elastic plastic such as heat resisting rubber.

6. In a labelling machine having a label transfer head displaceable between an initial label receiving position and a label deposit position, said transfer arm having a planarly faced suction head, the combination of a label magazine having a planar mouth portion juxtaposed to said transfer head when in label receiving position and a label storage chamber, said chamber comprising spaced side walls and a bottom retaining plate adjustably secured to the side walls, means for adjustably positioning the bottom plate relative to the said side walls to vary the size of the chamber, said storage chamber being inclined upwardly with respect to the mouth portion, supporting means for the magazine, means pivotally securing said chamber portion of said support for adjustably varying the angle between said mouth portion and the face of said suction head, a second securing means between said support and chamber portion for permitting adjustment of said chamber relative to said suction head in a direction longitudinally of said chamber, said support comprising adjusting means for displacing said magazine laterally with respect to said specified longitudinal direction, each of said adjusting means cooperating to orient the label storage chamber relative to the label transfer head whereby the mouth portion will present a foremost label centrally registered with respect to said transfer head.

7. In a labelling machine having a label storage magazine and an article receiving platen each located in a plane mutually perpendicular to the other, label transfer mechanism for transporting labels from the magazine to the platen comprising, a label transfer arm having a laterally extending suction head initially positioned adjacent the magazine, a transfer arm shaft, means for reciprocating said shaft longitudinally of its axis, means for oscillating said shaft about its axis, means pivotally securing said transfer arm to said transfer arm shaft to permit rotation of said suction head about the longitudinal axis of said transfer arm, means responsive to the said oscillating motion of said transfer arm shaft for rotating said suction head and control means for sequentially actuating said shaft oscillating means and said shaft reciprocating means to cyclically translate the suction head between its initial magazine and platen positions.

8. A label transfer mechanism as defined in claim 7, said shaft oscillating actuation means comprising a spring for translating said transfer arm from said specified initial position to platen position and a cam for returning the transfer arm to initial position against the action of said spring.

9. In a labelling machine, a label transfer mechanism comprising a reciprocable head, a label transfer arm extending laterally from said head, said transfer arm comprising, a longitudinal sleeve secured to said head, an outer shell including a recessed hub rotatably mounted on said sleeve and adapted to be oscillated between each of two limiting positions, a suction head extending transversely of said transfer arm secured to said shell, a torsion spring mounted within the recessed hub and anchored to said first head and hub portion respectively, said torsion spring biasing said rotatable outer shell to a position intermediate said specified limiting positions, an index pin on said hub portion, and an indexing plate mounted on said first head, said indexing plate having spaced camming surfaces and an intermediate clearance slot for receiving said index pin, said camming surfaces cooperating with the index pin for urging said shell and the attached suction head to each of its said specified limiting positions respectively against the action of said spring, upon reciprocation of said head.

10. A label transfer mechanism as defined in claim 9, said sleeve including a hollow core portion, said suction head having an air passage, and a rotatable air seal connecting said core portion with said air passage.

11. In a labelling machine, an article receiving platen, means for transferring a label from a storage magazine and depositing it on a designated area of said platen, means for orienting a label on an article placed on the platen coincident with such designated area of label deposit, said means comprising, a plurality of light sources and means for projecting light rays from said sources, said projecting means being related so as to project the light rays obliquely with respect to said area of label deposit, the angle of obliquity of each ray being equal and the point of intersection of said rays lying in the direction of the platen.

DAVID PARGH.

REFERENCES CITED

The following references are of record in the file of this patent:

UNITED STATES PATENTS

| Number | Name | Date |
|---|---|---|
| 1,950,373 | Depenbrock | Mar. 6, 1934 |
| 2,075,291 | Kath | Mar. 30, 1937 |
| 2,105,847 | Stake et al. | Jan. 18, 1938 |
| 2,166,419 | O'Neill | July 18, 1939 |
| 2,181,620 | Haupt | Nov. 28, 1939 |
| 2,189,296 | Oskow | Feb. 6, 1940 |
| 2,247,623 | Von Hofe | July 1, 1941 |
| 2,265,769 | Autem | Dec. 9, 1941 |
| 2,268,262 | Miller | Dec. 30, 1941 |
| 2,300,185 | Von Hofe | Oct. 27, 1942 |
| 2,321,661 | Craig | June 15, 1943 |
| 2,495,207 | Carter | Jan. 24, 1950 |

FOREIGN PATENTS

| Number | Country | Date |
|---|---|---|
| 261,094 | Great Britain | Nov. 15, 1926 |